US006759949B2

(12) United States Patent
    Miyahara

(10) Patent No.: US 6,759,949 B2
(45) Date of Patent: Jul. 6, 2004

(54) IMAGE ENHANCEMENT IN FAR INFRARED CAMERA

(75) Inventor: Shunji Miyahara, Yokohama (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 163 days.

(21) Appl. No.: 10/154,335

(22) Filed: May 23, 2002

(65) Prior Publication Data

US 2003/0218676 A1 Nov. 27, 2003

(51) Int. Cl.[7] .................................................. B60Q 1/00
(52) U.S. Cl. ....................... 340/435; 340/937; 348/148; 382/254
(58) Field of Search .......................... 340/903, 435, 340/905, 942, 937; 348/148, 149, 169; 382/254, 263, 274

(56) References Cited

U.S. PATENT DOCUMENTS

| | | | | |
|---|---|---|---|---|
| 3,953,667 A | * | 4/1976 | Layton et al. ............... | 348/164 |
| 4,027,159 A | | 5/1977 | Bishop ........................ | 250/338 |
| 4,445,138 A | | 4/1984 | Zwirn et al. ................. | 358/166 |
| 4,524,386 A | * | 6/1985 | Scott .......................... | 348/164 |
| 4,707,595 A | | 11/1987 | Meyers ........................ | 250/333 |
| 4,970,653 A | | 11/1990 | Kenue ......................... | 358/103 |
| 5,001,558 A | * | 3/1991 | Burley et al. ................ | 348/164 |
| 5,023,451 A | * | 6/1991 | Burley ........................ | 250/330 |
| 5,063,607 A | * | 11/1991 | FitzHenry et al. ............ | 382/274 |
| 5,414,439 A | | 5/1995 | Groves et al. ................ | 345/7 |
| 5,534,694 A | * | 7/1996 | Ball et al. .................... | 250/330 |
| 5,926,164 A | | 7/1999 | Terakawa et al. ............ | 345/112 |
| 5,963,148 A | | 10/1999 | Sekine et al. ................ | 340/905 |
| 6,038,496 A | | 3/2000 | Dobler et al. ................ | 701/3 |
| 6,067,110 A | | 5/2000 | Nonaka et al. .............. | 348/148 |
| 6,150,930 A | | 11/2000 | Cooper ........................ | 340/435 |
| 6,232,602 B1 | * | 5/2001 | Kerr ........................... | 250/330 |

FOREIGN PATENT DOCUMENTS

JP          10-165387           6/1998
JP          2000-316095         11/2000

OTHER PUBLICATIONS

M. Holz and E. Weidel, Night Vision Enhancement System Using Diode Laser Headlights, 1998.
Nancy S. Martinelli and Scott A. Boulanger, Cadillac DeVille Thermal Imaging Night Vision System, 2000.
United Kingdom Patent Office translation of Abstract of JP 2000316095.
United Kingdom Patent Office translation of Abstract of JP 10165387.

* cited by examiner

Primary Examiner—Brent A. Swarthout
(74) Attorney, Agent, or Firm—Brinks Hofer Gilson & Lione

(57) ABSTRACT

The present invention is an infrared imaging system that comprises a far-infrared camera disposed at the front end of a vehicle adapted for detecting thermal radiation in the 7 to 14 micron wavelength band and producing an image signal indicative of the temperature of the surrounding objects. A digital signal processor receives the image signal and selectively enhances the temperature resolution based upon the relative temperature distribution of the image signal, which is proportional to the temperature of objects emitting in the infrared region. In accordance with the present invention, the digital signal processor enhances temperature ranges having high concentrations and contracts temperature ranges having low concentrations. The digital signal processor selects between high and low concentrations based upon a predetermined threshold concentration value. A display apparatus receives a display signal that is temperature-enhanced and displays that signal to the driver.

19 Claims, 4 Drawing Sheets

IMAGE ENHANCEMENT IN FAR INFRARED CAMERA

BACKGROUND OF THE INVENTION

1. Technical Field of the Invention

The present invention relates to an imaging system for a motor vehicle, and in particular to an imaging system in which detected infrared radiation is processed by a digital signal processor in order to visually enhance road conditions based upon temperature.

2. Description of the Prior Art

Poor visibility at night results from a number of causes that have conspired to make traveling after dark a potentially troublesome situation. A typical driver uses low beam head lamps in most driving conditions after dark. Low beams, however, have a limited range and can illuminate a relatively small portion of the road ahead. Moreover, most drivers have experienced the temporary blinding effect caused by the head lamps of oncoming vehicles. The scattering of light is worsened in wet conditions due to the reflective surface of the roads. Rain, snow, fog and other types of inclement weather further limit visibility at night.

As a result of reduced visibility at night, engineers turned to other means of visualization that involved detecting radiation that is otherwise invisible to the human eye. All objects are, to a greater or lesser extent, both emitters and reflectors of radiation. There is a correlation between the temperature of an object and the wavelength of radiation emitted by that object, a principle known as black body radiation. For objects having a temperature between 0° and 50° C., as is most common in everyday experience, the radiation emitted is in the infrared band of the spectrum. Even though an object is not reflecting visible light that same object is likely emitting infrared light. Scientists and engineers created a means of detecting infrared radiation thereby permitting the visualization of otherwise invisible objects—a night vision system.

One such night vision system is known as thermal imaging. Developed by the military, thermal imaging was once thought to be too expensive and cumbersome for use in the consumer vehicle market. However, recent advances in electronics and infrared detectors have made the use of night vision in consumer vehicles more tenable, and at least one manufacturer recently incorporated thermal imaging system into a vehicle.

Both passive and active imaging systems exist. A passive system is not unlike the human-eye in that it primarily detects radiation that is emitted from objects. On the other hand, an active system projects radiation and then primarily detects the reflection of that radiation off of objects. Passive systems have several advantages over their active counterparts. Most importantly, passive systems do not project any kind of radiation from the vehicle, and thus will not interfere with the surrounding environment or with the imaging systems of other vehicles. A far infrared camera is an example of a passive system, and it is the infrared camera utilized in the present invention.

In general, a far-infrared camera detects radiation in the 7 to 14 micron wavelength band. This wavelength band corresponds to a temperature range of approximately −20° to 50° C. that covers all objects that are of interest to automotive engineers. The human body, for example, has a peak emission at approximately 9.3 microns, which corresponds to the human body temperature of about 37° C.

A consumer vehicle thermal imaging system is typified by the Cadillac Deviled Thermal Imaging Night Vision System by General Motors. The Cadillac system consists of a thermal imaging camera, a heads-up display, and image controls. As in other thermal imaging systems, the Cadillac system uses a camera to capture infrared data, the camera electronics to process the data, and a heads-up display to present the information to the driver.

Despite the Cadillac system improving night driving conditions, there remains a persistent problem in the resolution and contrasting of the infrared image. Although a standard far-infrared camera can detect incremental temperature ranges over a wide range of temperatures, the image presented to the driver does not adequately reflect subtle distinctions between objects. Most importantly, existing imaging systems cannot distinguish the road boundary from the road, nor can they distinguish the lane markers that separate traffic from the road.

Thus, there is a need for a far-infrared imaging system for use in a vehicle that enhances the relative temperature distinctions between objects such that a driver will be presented with a complete representation of the road conditions, including the road boundaries and lane markers.

SUMMARY OF THE INVENTION

The present invention is an infrared imaging system that comprises a far-infrared camera disposed at the front end of a vehicle adapted for detecting thermal radiation in the 7 to 14 micron wavelength band and producing an image signal indicative of the temperature of the surrounding objects. A digital signal processor receives the image signal and selectively enhances the temperature resolution based upon the relative temperature distribution of the image signal, which is proportional to the temperature of objects emitting in the infrared region. A display apparatus receives a display signal that is temperature enhanced, or temperature warped, and displays that signal to the driver.

The far-infrared camera detects thermal radiation and produces an image signal indicative of the temperature of the objects, the image signal having selected temperature concentrations depending on the wavelength of the radiation emitted. A digital signal processor receives the image signal, calculates the temperature distribution of the signal, and selectively discriminates between temperature concentrations based upon the temperature distribution such that large temperature concentrations are mapped from the image signal to a display signal in which the resolution and differences in temperature are more evident to the driver. The display apparatus is disposed within the vehicle such that the vehicle operator is informed of the driving conditions ahead.

The present invention also provides a method for enhancing the thermal imaging resolution of an infrared camera for a vehicle. The method comprises receiving thermal radiation and producing an image signal in response thereto, calculating the concentrations of radiation, and mapping the high concentrations of radiation into a display signal thereby thermally enhancing the display signal. The display signal is then displayed to the vehicle operator such that the vehicle operator can visually detect subtle distinctions in the road features, including the road boundary and lane markers as well as pedestrians.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION OF THE PREFERRED EMBODIMENT

Figure 1:
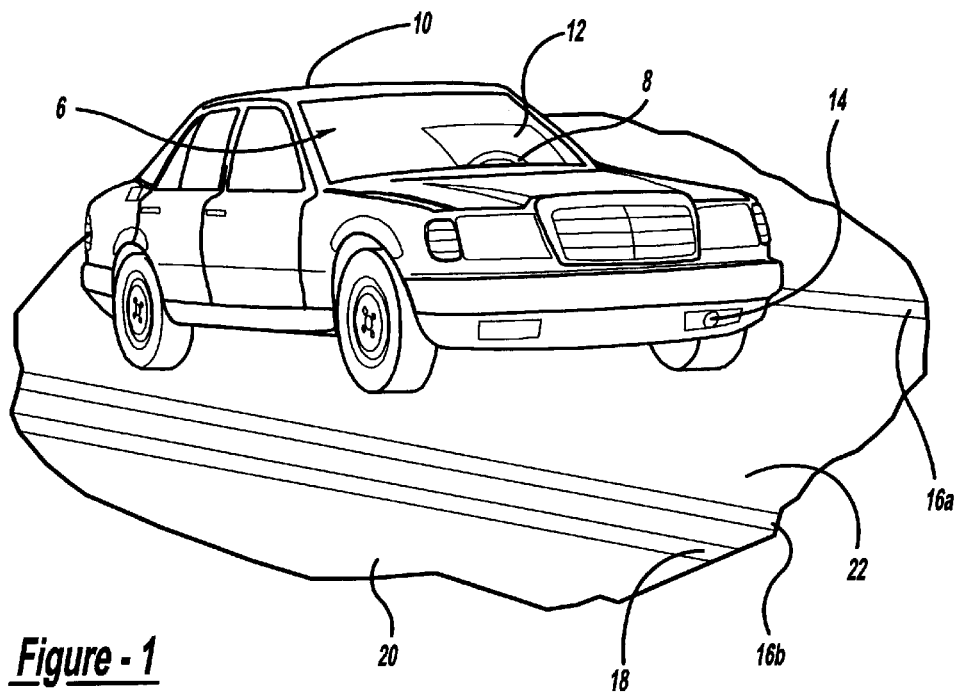
FIG. 1 is a perspective view of a motor vehicle equipped with the infrared imaging system of the present invention.

Illustrative of the preferred embodiment of the present invention, FIG. 1 shows a perspective view of a vehicle 10 disposed between a pair of lane markers 16a and 16b upon a road 22. The road 22 is bounded on one side by a boundary 18, which generally consists of a curb, a sidewalk, or simply bare ground. A peripheral space 20 is located adjacent to the boundary 18. The peripheral space 20 generally consists of grass, dirt, or some other surface not suitable for driving and which a vehicle operator (not shown) would preferably avoid.

The vehicle 10 is equipped with the infrared imaging system of the present invention, including a far-infrared camera (FIR camera) 14 and a display 12. A digital signal processor 24 that is coupled to both the FIR camera 14 and the display 12 is not shown, but may be located within the vehicle 10 at any convenient position. As shown, the display 12 is of the type known as a head-up display, which may be located above a steering wheel 8 inside a passenger compartment 6 of the vehicle. In the head-up embodiment, the display 12 is disposed directly along the vehicle operator's line of sight so as to provide little interruption or distraction during driving. Alternatively, the display 12 may include a video monitor or other suitable device for communicating visual data to the vehicle operator.

Figure 2:
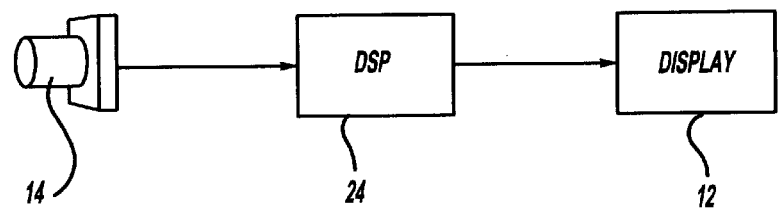
FIG. 2 is a block of the primary components of the infrared imaging system of the present invention.

FIG. 2 is a block diagram of the primary components of the infrared imaging system of the present invention. The FIR camera 14 is coupled to the digital signal processor 24. The digital signal processor 24 is coupled to the display 12. The digital signal processor 24 functions to receive an image signal from the FIR camera 14, process the image signal, and then transmit a display signal to the display 12 for viewing by the vehicle operator.

Figure 3:
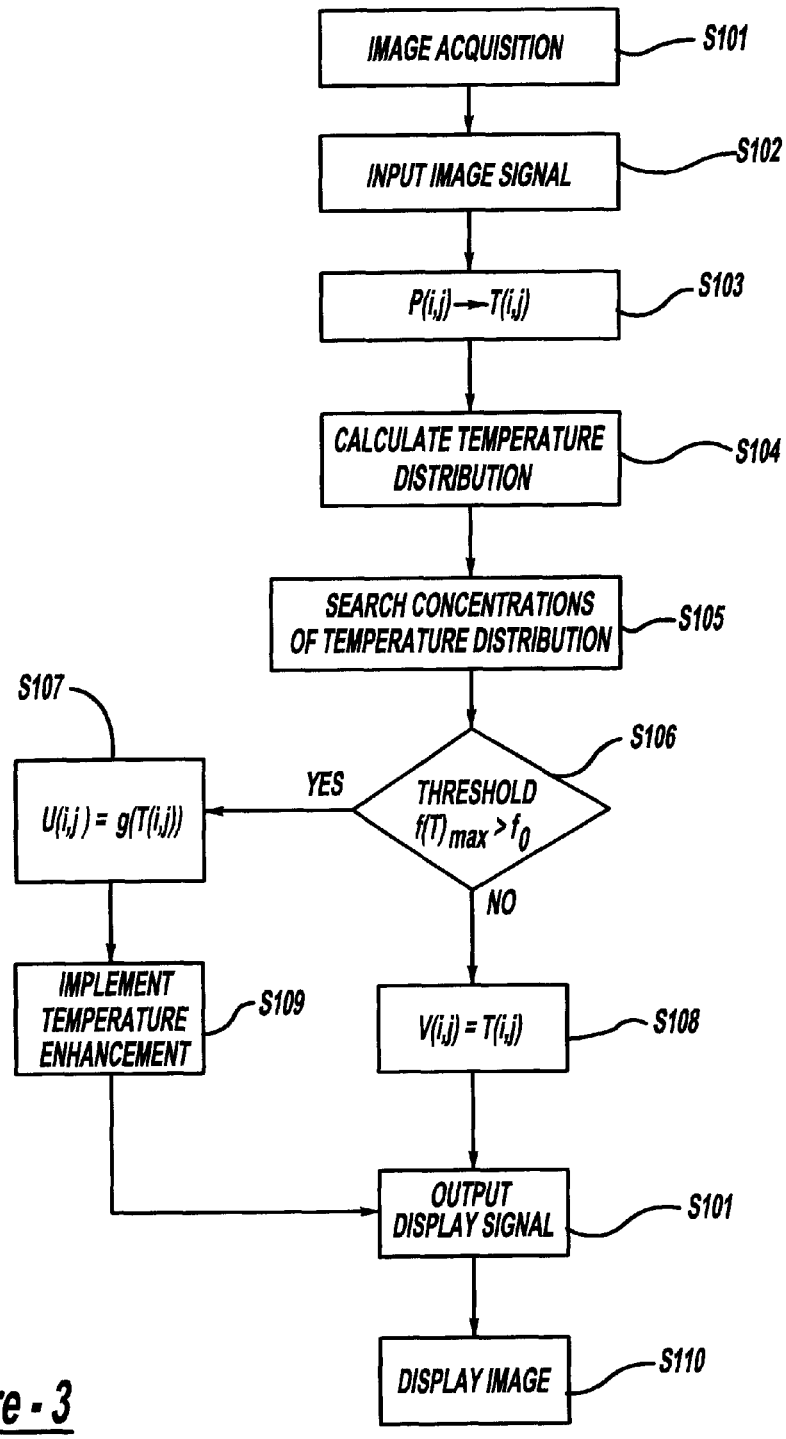
FIG. 3 is a flow chart depicting the process by which a typical infrared image is thermally enhanced in accordance with the present invention.

The process of thermal enhancement is depicted in the flow chart of FIG. 3. In step S101, the FIR camera 14 detects radiation emitted from objects within its field of view. In a preferred embodiment, the FIR camera 14 is adapted to far infrared radiation in the range of 7 to 14 microns. The preferred field of view of the FIR camera is greater than 11 degrees over a range of approximately 400 meters. The FIR camera 14 typically detects radiation using a Vanadium Oxide Bolometer (not shown) or other infrared light-sensing means, which produces an electronic signal in response to irradiation from photons of a particular wavelength. The light sensing means will typically correlate emitted thermal energy from an area in the camera's field of view with a cell in the detection plane of the radiation detector (not shown). Each cell is designated by a row number <i> and a column number <j>, such that the radiation detected at any point in the plane can be designated as $P_{i,j}$. Thus, the data gathered by the light-sensing means consists of an array of values assigned to a spatial coordinate that corresponds to an image received by the FIR camera 14.

The preferred FIR camera 14 is adapted to assemble the electronic data into an image signal which is indicative of the radiation incident upon the light-sensing means. Typically, the image signal will consist of the radiation values at each point $P_{i,j}$, as detected by the light-sensing means.

In step S102, the image signal is transmitted from the FIR camera 14 to the digital signal processor 24.

In step S103, the digital signal processor 24 correlates the image signal into a set of points in which the radiation values for each point, $P_{i,j}$, are assigned a temperature value, $T_{i,j}$, based upon the known relationships between the thermal radiation emitted by an object and its temperature. Thus, the digital signal processor 24 assembles a set of values $T_{i,j}$ that are indicative of the temperature at each point in the image received by the FIR camera 14.

Figure 4A:
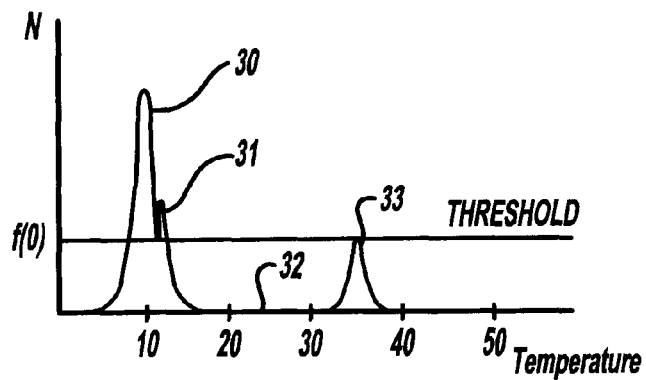
FIGS. 4a and 4b are graphical representations of the thermal enhancement of a typical infrared image and the thermally-enhanced infrared image in accordance with the present invention.

In step S104, the digital signal processor 24 calculates a temperature distribution function, N=f(T), also referred to as a temperature histogram. The temperature distribution function is a relationship between the temperature at a point, $T_{i,j}$, and the number of points $P_{i,j}$, that have that temperature, as shown in FIG. 4a. The temperature distribution function is thus a mathematical relationship describing the concentration of temperatures within an image signal.

Figure 5A:
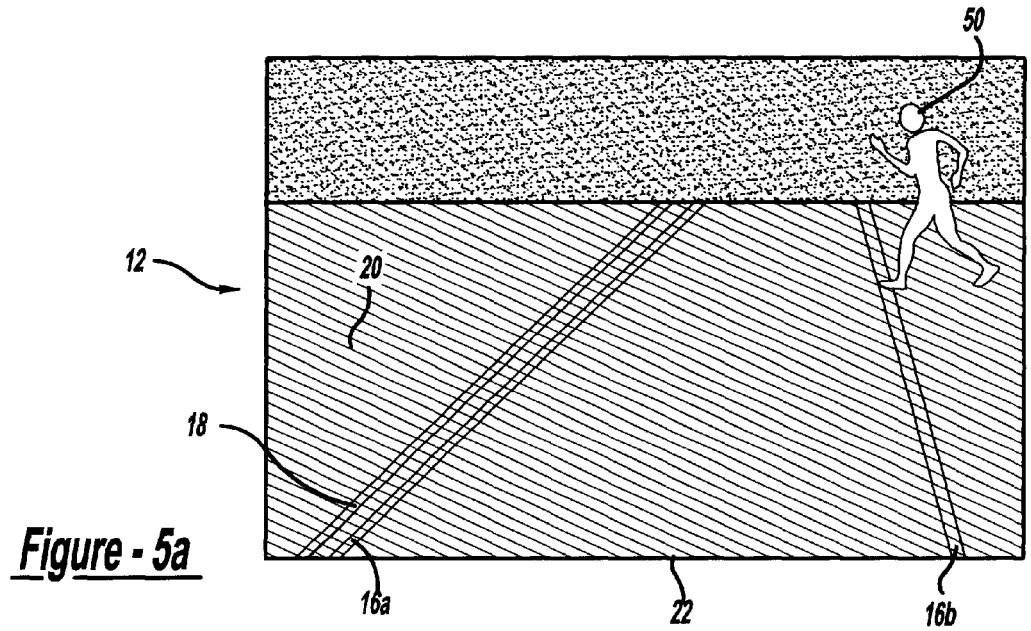
FIG. 5a is a schematic view from the perspective of a vehicle driver depicting a typical image rendered by an infrared imaging system.

In step S105, the digital signal processor 24 searches temperature distribution function for large concentrations of temperature values, as shown in FIG. 5a. In the decision block of step S106, the digital signal processor 24 compares each temperature distribution value f(T) with a threshold concentration value $f_o$ indicative of a particular concentration N. The threshold concentration value is predetermined, and in alternative embodiments, may be constant or variable depending upon the driving environment of vehicle 10.

The digital signal processor 24 calculates a maximum value of the temperature distribution f(T), from T=−20° C. to T=50° C. If the maximum value of the temperature distribution is greater than the threshold value, $f_o$, then the digital signal processor 24 proceeds to step S107. Conversely, if the maximum value of the temperature distribution is less than the threshold value, $f_o$, then the digital signal processor 24 proceeds to step S108.

In step S108, for each point (i,j), $T_{i,j}$ is assigned a corresponding value $V_{i,j}$, which is adapted for receipt and display by the display 12. That is, the as the display signal $V_{i,j}$ is the same as the image signal $T_{i,j}$.

Conversely, in step S107, the digital signal processor 24 enhances the temperature dependence of the temperature distribution, f(T). The digital signal processor 24 enhances the temperature dependence of the temperature distribution by implementing the following mathematical transform:

$$U_{ij} = g(T_{ij}), \text{ where} \tag{1}$$

$$g(T) = \int \frac{dU}{dT} dT, \text{ and further where} \tag{2}$$

-continued $$\frac{dU}{dT} = f(T) + \text{constant, and} \quad (3)$$

$$F(U) = f(g^{-1}(U_{ij})). \quad (4)$$

Equation (1) defines the enhanced temperature, $U_{ij}$. Equation (2), g(T), is a the temperature transform function. Equation (4) defines the new distribution of the enhanced temperature, F(U).

By implementing equation (2), the digital signal processor 24 creates an enhanced temperature distribution given by equation (4). Thus, in step S107 the appropriate temperature transform function is determined. In step S109, the temperature $T_{i,j}$ is transformed to the enhanced temperature, denoted $U_{i,j}$.

Figure 4B:
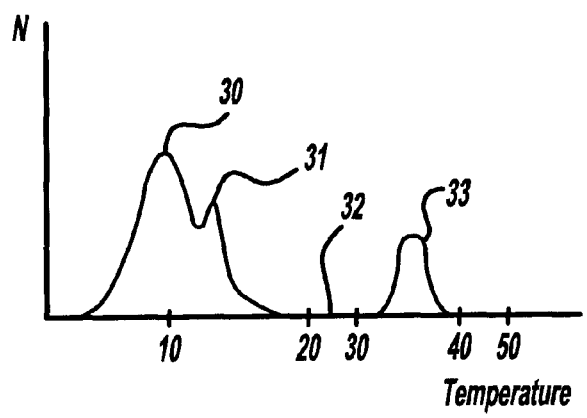

The thermal enhancement of steps S107 and S109 is represented graphically in FIGS. 4a and 4b. FIG. 4a depicts a temperature distribution function as calculated by the digital signal processor 24. There are two peak concentrations in temperature regions. A first concentration 30 about 10° C. is likely inanimate and indicative of the road and the surrounding environment. Note that the first concentration 30 has a local peak 31 at approximately 12° C. The first concentration 30 is greater than the threshold value, $f_o$, and all of the points (i,i) are temperature enhanced in accordance with steps S107 and S109.

FIG. 4b represents the temperature distribution function after the enhancement of steps S107 and S109. The first concentration 30 and the second concentration 33 have been expanded relative to the central regions of low concentration 32. Regions of low concentration, between 17° and 33° C. are contracted, emphasizing the distinction between the local peak 31 and the first concentration 30.

Returning to FIG. 3, in step S109, the digital signal processor assembles a complete set of points for a display signal consisting of the $U_{i,j}$ by utilizing the temperature transform function of step S107. The display signal of step S109 is transmitted to display 12 where it is displayed for viewing by the vehicle operator.

In step S110 of FIG. 3, the display 12 displays the display signal as an image which the vehicle operator may readily view while driving.

Figure 5B:
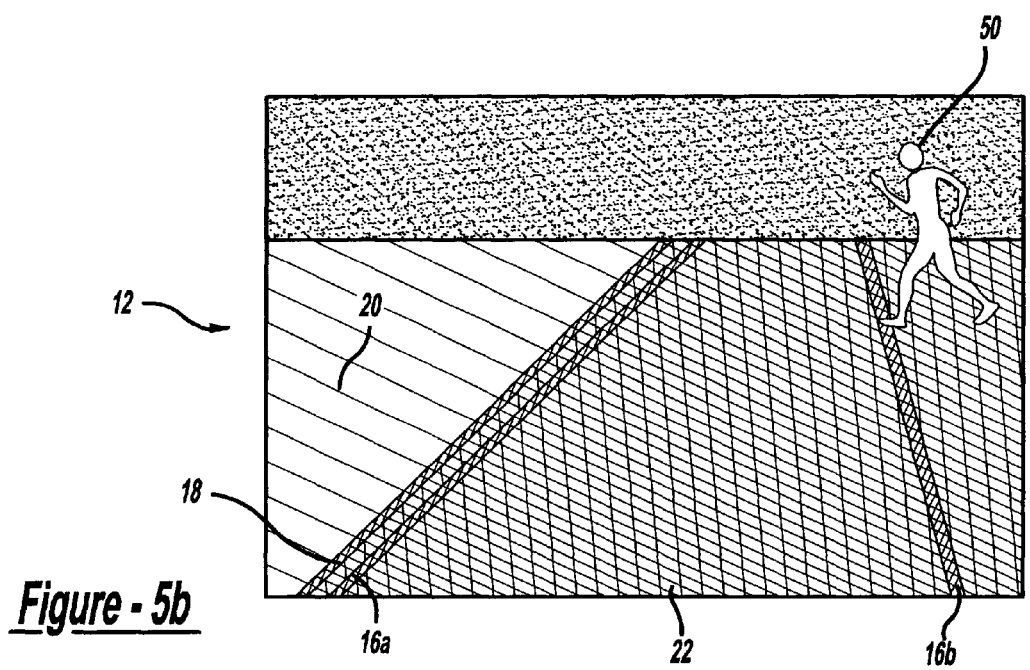
FIG. 5b is a schematic view from the perspective of a vehicle driver depicting a thermally-enhanced image rendered by the infrared imaging system of the present invention.

FIGS. 5a and 5b are representative illustrations of the beneficial effects of the temperature enhancement process of steps S107 and S109. FIG. 5a is a schematic perspective view of the display 12 as seen by the vehicle operator. The road 22 is bounded by the lane markers 16a and 16b and bounded further by the boundary 18. Adjacent to the boundary 18 is the peripheral space 20 which, as noted above, is not suitable for driving. Additionally, a pedestrian 50 is shown crossing road 22.

FIG. 5a is a representative image from a typical infrared imaging system that does not possess the temperature enhancement of the present invention. As shown, the road 22 is not readily distinguishable from the lane markers 16a and 16b. Moreover, the boundary 18 is not readily distinguishable from the peripheral space 20. Thus, although the vehicle operator can see the pedestrian 50, the vehicle operator cannot distinguish the features and boundaries of the road 22 without undue hesitation and concentration.

In contrast, FIG. 5b is a representative image from the infrared imaging system that has been temperature enhanced in accordance with the present invention. As shown, the pedestrian 50 is still clearly visible. Moreover, the road 22 and its features and boundaries are more readily distinguishable. The lane markers 16a and 16b, due to their thermal properties, are distinguished from the road 22. The road boundary 18 is also visible without undue concentration. The peripheral area 20, which the vehicle operator wishes to avoid, can be distinguished from the road 22 as well. The visibility of the pedestrian 50 is not degraded.

The temperature enhancement of FIG. 5b is illustrative of how the digital signal processor 24 finds a high concentration of temperatures and enhances that concentration. For example, in general the road 22, the lane markers 16a, 16b, the road boundary 18, and the peripheral area 22 will be approximately of the same temperature, i.e. within a certain range corresponding to the first concentration 30 of FIG. 4a. The process of temperature enhancement magnifies the first concentration 30 such that formerly unnoticeable subtleties are more apparent. Therefore, as shown in FIG. 5b, the road 22 is distinguishable from the lane markers 16a and 16b as well as the road boundary 18 and peripheral area 20 in spite of the close relative temperatures of each of the foregoing. The visibility of the pedestrian 50 is not degraded.

The present invention as described in its preferred embodiment thus improves the image quality of infrared imaging systems by enhancing temperature distinctions for highly concentrated temperature ranges. It should be apparent to those skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

I claim:

1. An infrared imaging system for a vehicle comprising:
   an infrared camera disposed at a front end of the vehicle, said infrared camera adapted for receiving a spectrum of radiation and producing an image signal in response; and
   a digital signal processor adapted for receiving said image signal and processing said image signal thereby creating a display signal,
   said digital signal processor processing said image signal by calculating an intensity distribution of said image signal, discerning a maximum value of said intensity distribution, and by mapping said image signal into said display signal by expanding a region of high intensity and contracting a region of low intensity such that said region of high intensity is thermally enhanced.

2. The infrared imaging system of claim 1 further comprising a display for viewing by a vehicle operator.

3. The infrared imaging system of claim 2 wherein said display is a head-up display.

4. The infrared imaging system of claim 2 wherein said display is a video monitor.

5. The infrared imaging system of claim 1 wherein said infrared camera is adapted to detect radiation in a range from 7 microns to 14 microns.

6. The infrared imaging system of claim 1 wherein said digital signal processor compares said maximum value of said intensity distribution to a threshold concentration value.

7. The infrared imaging system of claim 6 wherein in response to said maximum value of said intensity distribution being greater than said threshold concentration value, said digital signal processor temperature enhances said image signal.

8. A vehicle having an infrared imaging system, said vehicle comprising:
   an infrared camera disposed at a front end of said vehicle, said infrared camera adapted for receiving a spectrum of radiation and producing an image signal in response thereto;

a display disposed within said vehicle and a digital signal processor receiving said image signal, calculating an intensity distribution of said image signal, discerning a maximum value of said intensity distribution, and by mapping said image signal into said display by expanding a region of high intensity and contracting a region of low intensity such that said region of high intensity is thermally enhanced;

the thermally-enhanced display signal being transmitted to said display such that a thermally-enhanced infrared image is displayable within a passenger compartment of said vehicle.

9. The vehicle of claim 8 wherein said display is a head-up display.

10. The vehicle of claim 8 wherein said display is a video monitor.

11. The vehicle of claim wherein said infrared camera is adapted to detect radiation in a range from 7 microns to 14 microns.

12. The vehicle of claim 8 wherein said digital signal processor compares said maximum value of said intensity distribution to a threshold concentration value.

13. The vehicle of claim 12 wherein in response to said maximum value of said Intensity distribution being greater than said threshold concentration value, said digital signal processor temperature enhances said image signal.

14. A method for enhancing the thermal imaging resolution of an infrared camera for a vehicle, said method comprising:

receiving a spectrum of radiation and producing an image signal in response thereto;

discerning a maximum value of an intensity spectrum of said image signal;

comparing said maximum value to a threshold value; and transforming said image signal into a thermally-enhanced display signal to when said maximum value is greater than said threshold value, said display signal being thermally-enhanced by expanding a region of high intensity and contracting a region of low intensity such that the region of high intensity is thermally-enhanced.

15. The method of claim 14 further comprising the step of displaying said display signal in a passenger compartment of said vehicle.

16. The method of claim 15 wherein the step of displaying said display signal in a passenger compartment includes displaying said display signal using a head-up display.

17. The method of claim 15 wherein the step of displaying said display signal in a passenger compartment includes displaying said display signal using a video monitor.

18. An infrared imaging system for a vehicle comprising:

an infrared camera disposed at a front end of the vehicle, said infrared camera adapted for receiving a spectrum of radiation and producing an image signal in response thereto; and a digital signal processor adapted for receiving said image signal and processing said image signal into a display signal, said digital signal processor processing said image signal by calculating an intensity distribution of said image signal, discerning a maximum value of said intensity distribution, comparing said maximum value of said intensity distribution to a threshold concentration value, and, when said maximum value of said intensity distribution is greater than said threshold concentration value, mapping said image signal into said display signal by expanding a region of high intensity and contracting a region of low intensity such that said region of high intensity is thermally enhanced.

19. A vehicle having an infrared imaging system, said vehicle comprising:

an infrared camera disposed at a front end of said vehicle, said infrared camera adapted for receiving a spectrum of radiation and producing an image signal in response thereto;

a display disposed within said vehicle; and a digital signal processor receiving said image signal, calculating an intensity distribution of said image signal, discerning a maximum value of said intensity distribution, comparing said maximum value of said intensity distribution to a threshold concentration value, and, when said maximum value of said intensity distribution is greater than said threshold concentration value, mapping said image signal into said display signal by expanding a region of high intensity and contracting a region of low intensity such that said region of high intensity is thermally enhanced, the thermally-enhanced display signal being transmitted to said display such that a thermally-enhanced infrared image is displayable within a passenger compartment of said vehicle.

* * * * *

UNITED STATES PATENT AND TRADEMARK OFFICE
CERTIFICATE OF CORRECTION

PATENT NO. : 6,759,949 B2
DATED : July 6, 2004
INVENTOR(S) : Shunji Miyahara

It is certified that error appears in the above-identified patent and that said Letters Patent is hereby corrected as shown below:

Column 6,
Line 34, delete "response;" and substitute -- response thereto; -- in its place.

Column 7,
Line 3, after "distribution, and" delete "by".
Line 17, delete "claim" and substitute -- claim 8 -- in its place.
Line 24, before "distribution" delete "Intensity" and substitute -- intensity -- in its place.

Signed and Sealed this

Twelfth Day of October, 2004

JON W. DUDAS
*Director of the United States Patent and Trademark Office*